United States Patent
O'Toole et al.

(10) Patent No.: US 6,373,860 B1
(45) Date of Patent: Apr. 16, 2002

(54) DYNAMICALLY-ASSIGNED VOICE AND DATA CHANNELS IN A DIGITAL-SUBSCRIBER LINE (DSL)

(75) Inventors: Anthony J. P. O'Toole, San Jose; Faraj Aalaei, Fremont, both of CA (US)

(73) Assignee: Centillium Communications, Inc., Fremont, CA (US)

( * ) Notice: Subject to any disclaimer, the term of this patent is extended or adjusted under 35 U.S.C. 154(b) by 0 days.

(21) Appl. No.: 09/124,333

(22) Filed: Jul. 29, 1998

(51) Int. Cl.[7] ................................................ H04J 1/02
(52) U.S. Cl. ...................... 370/493; 370/470; 370/442
(58) Field of Search ............................... 370/442, 494, 370/495, 527, 480, 493

(56) References Cited

U.S. PATENT DOCUMENTS

| | | | |
|---|---|---|---|
| 4,771,425 A | 9/1988 | Baran et al. ................. 370/85 |
| 5,239,544 A | 8/1993 | Balzano et al. ............ 370/94.2 |
| 5,274,635 A | 12/1993 | Rahman et al. ............ 370/60.1 |
| 5,345,443 A | 9/1994 | DAmbrogio et al. ......... 370/60 |
| 5,436,899 A | 7/1995 | Fujino et al. ................ 370/79 |
| 5,450,411 A | 9/1995 | Heil ........................... 370/94.2 |
| 5,463,629 A | 10/1995 | Ko ............................ 370/110.1 |
| 5,475,686 A | 12/1995 | Bach et al. ................... 370/84 |
| 5,502,723 A | 3/1996 | Sanders ..................... 370/60.1 |
| 5,594,727 A | 1/1997 | Kolbenson et al. ......... 370/442 |
| 5,621,720 A | 4/1997 | Bronte et al. ................. 370/13 |
| 5,661,725 A | 8/1997 | Buck et al. ................. 370/377 |
| 5,828,666 A * | 10/1998 | Focsaneanu et al. ........ 370/389 |
| 5,901,205 A * | 5/1999 | Smith et al. .............. 379/93.01 |
| 6,061,392 A * | 5/2000 | Bremer et al. ............... 375/222 |
| 6,091,717 A * | 7/2000 | Honkasalo et al. .......... 370/329 |
| 6,181,715 B1 * | 1/2001 | Phillips et al. ............... 370/493 |
| 6,269,154 B1 * | 7/2001 | Chellali et al. ........... 379/93.28 |

OTHER PUBLICATIONS

"Front Desk" ISDN Brochure, Jetstream Communications, pp. 1–7, 1997.
"New Communications Technologies" ISDN Brochure, Jetstream Communications, pp. 1–20, 1997.

* cited by examiner

*Primary Examiner*—Alpus H. Hsu
*Assistant Examiner*—Thien Tran
(74) *Attorney, Agent, or Firm*—Stuart T. Auvinen

(57) ABSTRACT

A Digital-Subscriber Line (DSL) modem dynamically allocates its bandwidth to voice calls or data traffic as needed. Low-level frames are divided into several 64-Kbit/sec timeslots, each able to carry one voice call. These low-level frames are repeated several times in a 1-KHz frame that is synchronized to network timing references such as an 8-KHz clock used by the telephone network's pulse-code-modulated (PCM) highway. The 1-KHz frames are grouped into superframes. The low-level timeslots are allocated to either voice channels or to unchannelized data, depending on the number of voice calls currently being made. Allocations are made once for each superframe. The allocations or assignment of each of the timeslots to either voice or data is determined and sent to the remote modem or line card before the next superframe begins. When a good CRC occurs, the allocation sent is used to format the next superframe. Allocation bits for each of the timeslots indicate that the timeslot is for voice or for data. Different line and data rates result in different numbers of the 64-Kbit timeslots. Formats of the 8-KHz frames and superframes are fixed. The superframes contain framing bits that carry the next superframe's allocation to the remote modem.

15 Claims, 13 Drawing Sheets

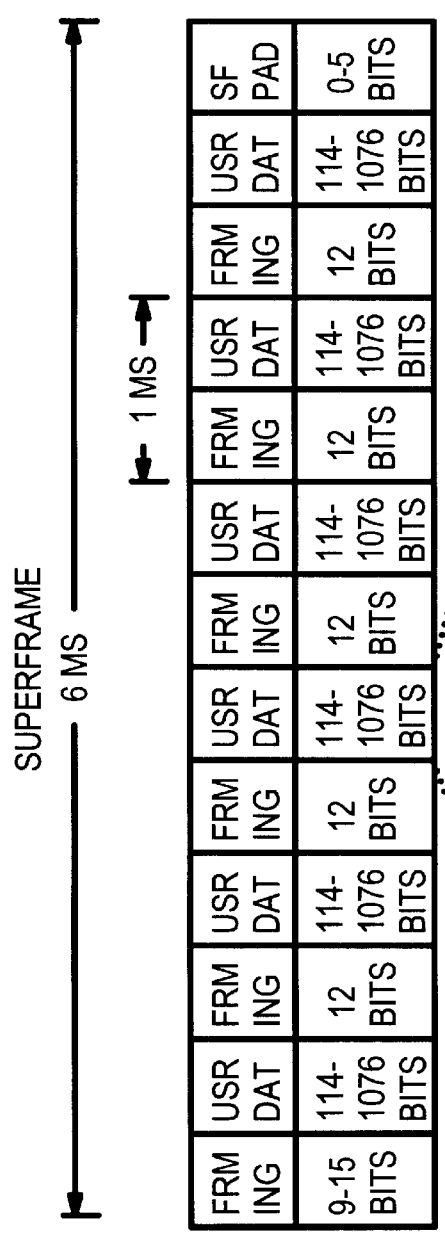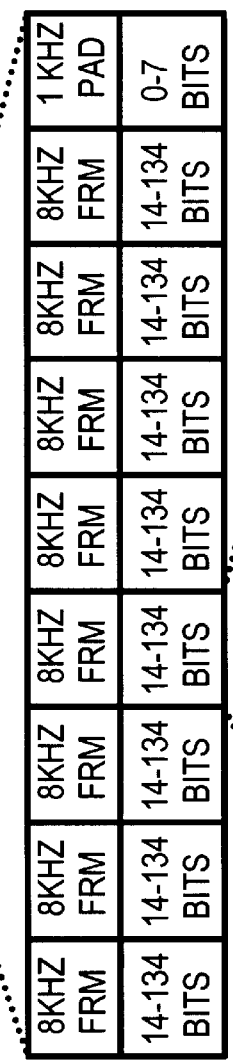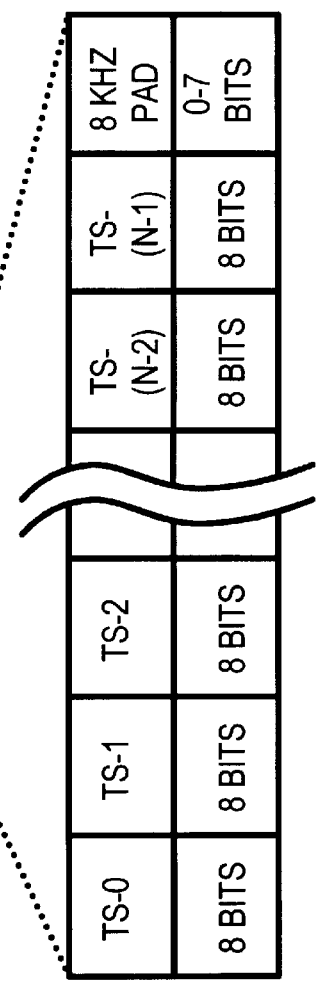

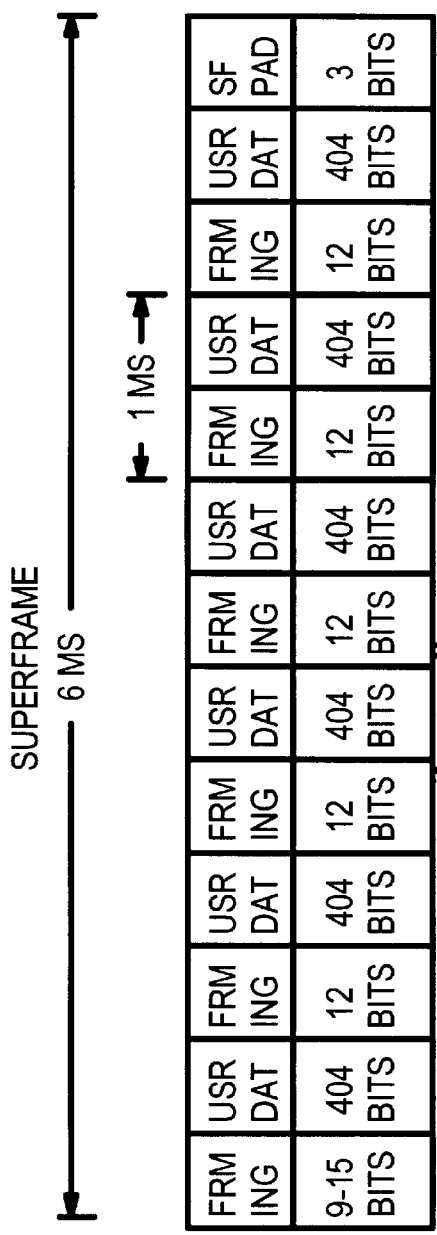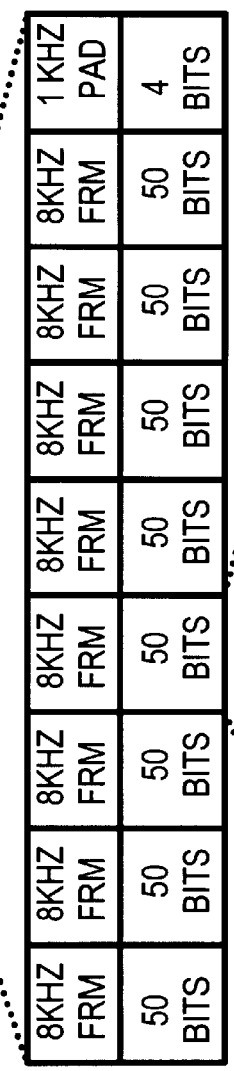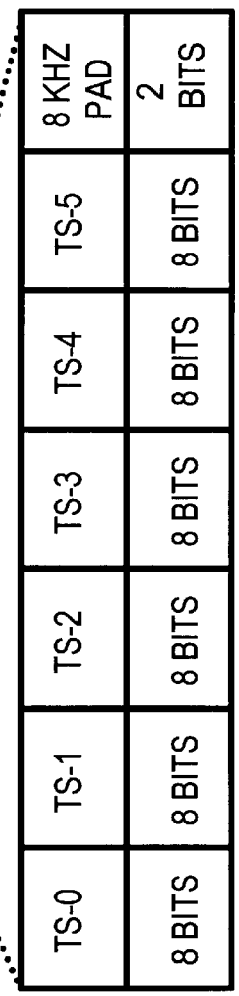
FIG. 12A
FIG. 12B
FIG. 12C

FIG. 16

FIG. 17

DYNAMICALLY-ASSIGNED VOICE AND DATA CHANNELS IN A DIGITAL-SUBSCRIBER LINE (DSL)

FIELD OF THE INVENTION

This invention relates to telephone systems, and more particularly to Digital-Subscriber Lines (DSL) carrying both voice and data traffic.

BACKGROUND OF THE INVENTION

The telephone system was originally constructed for carrying voice calls. With the widespread acceptance of personal computers and wide-area data networks such as the Internet, telephone networks are carrying more and more data traffic. Digital telephone lines such as Integrated Services Digital Network (ISDN) and T1 lines carry both data and voice traffic. Some higher-speed Digital-Subscriber Lines (DSL) also reserve some bandwidth for voice calls.

ISDN Bearer Channel Allocation—FIG. 1

FIG. 1 shows an ISDN line used for both voice and data traffic. The customer premises equipment (CPE) includes ISDN terminal adapter or modem 12 that receives a data stream from a computer. ISDN modem 12 may include one or two plain-old-telephone-service (POTS) voice ports that can be connected to standard telephone or fax equipment. ISDN modem 12 transmits data or digitized voice over telephone line 20, which is an ISDN line using digital rather than analog signaling.

At the Phone Company's central office (CO), ISDN line card 14 terminates ISDN telephone line 20. The data or digitized voice is sent over the public switched-telephone network (PSTN) that includes circuit switched network 22. When ISDN modem 12 transmits a voice call, the call is sent over circuit switched network 22 to other voice telephones over voice lines 26, 27. However, when data is sent by ISDN modem 12, the remote number called is connected to another computer (not shown) at Internet Service Provider (ISP) 21.

ISDN telephone line 20 carries three independent channels: a low-bandwidth data channel D is primarily used for control signals, while bearer channels B1, B2 are each 64 Kbps channels, each capable of carrying one voice call. When no voice calls are being made, ISDN modem 12 routes the data stream over both bearer channels B1, B2, providing a combined bandwidth of 128 Kbps. These two bearer channels remain as two separate calls within the PSTN, since ISDN line card 14 makes two connections 24, 25 to circuit switched network 22. These two calls are sent over two lines 28, 29 to ISP 21. At ISP 21, upper-layer software 18 combines data from the two lines 28, 29 into a single data stream. Thus the single data stream from the user is split into two separate calls to ISP 21.

When the user makes or receives a voice call, one of the bearer channels is dropped and no longer carries data. The data bandwidth then falls to 64 Kbps since only one bearer channels B1 in ISDN telephone line 20 is used for data, and only one connection 24 and only one of two lines 28, 29 are used. The other bearer channel B2 is used for the voice call, connecting the user's telephone or fax with a remote telephone or fax on voice line 26. ISDN line card 14 uses the other connection 25 to connect with circuit switched network 22 and voice line 26. When two voice calls are simultaneously made, then both bearer channels are used and no data can be transmitted. Thus ISDN modem 12 is able to drop one of the bearer channels for a voice call. Once the voice call ends, ISDN modem 12 reconnects the second bearer channel to ISP 21.

While ISDN bearer channels can be dropped and reconnected as voice and data loads change, the low bandwidth of ISDN limits its future usage. Having to separate data connections through the PSTN that must be recombined by software at the ISP is also undesirable.

Fixed Allocation of Voice and Data Channels of T1 Lines—FIG. 2

FIG. 2 highlights a high-speed T1 phone line that has fixed allocations of its bandwidth to voice and data traffic. Larger corporations often connect to the telephone network over 1.5-Mps T1 or 45-Mbps T3 lines.

T1 lines can be partitioned into a number of 64 Kbit DS0 channels to carry several separate voice calls, with the remaining bandwidth used for data traffic. For example, the T1 line can have 256 Kbps allocated for voice calls, with the remaining 1.25 Mbps for data traffic. The 256 Kbps allocated for voice can carry four separate voice calls at one time.

While it is useful to allocate some of the bandwidth of a T1 line to voice calls, the allocation does not vary over time. Once the T1 line is configured for four voice calls, the allocation cannot be changed when five or more voice calls are received. The fifth caller hears a busy signal. Since calls often occur together at peak times such as just after lunch, bandwidth must be reserved for these peak times. Data bandwidth is restricted for all times of the day and night by the peak voice bandwidth than occurs only infrequently.

DSL With POTS Band—FIG. 3

FIG. 3 is a graph of DSL frequency bands with a lower POTS band. FIG. 3 shows frequency bands for asymmetric DSL, or ADSL (T1.413) service using frequency-division duplex and voice calls. FIGS. 3 is not drawn with a linear scale. Plain-old-telephone service (POTS) voice calls are transmitted over low-frequency POTS band 2, as they are for standard telephone lines. POTS band 2 operates from near D.C. to 4 kHz. Since this is the same frequency range as standard telephones, ordinary telephone equipment or voice-band modems can be used over POTS band 2.

ADSL upstream channel 4 is for uploads from the customer, or for sending commands and user input from the customer to the central office side. Some embodiments may use a bi-directional channel in place of upstream channel 4. Upstream channel 4 operates at up to 138 kHz, with the data rate up to 1 Mbps.

Wide-band 5 carries the bulk of the ADSL-line bandwidth. Wide-band 5 carries ADSL data downstream to the customer at up to 8 Mbps. Wide-band 5 is a frequency band typically from 140–200 kHz up to about 1.1 MHz. The lowest frequencies are reserved for POTS. Other kinds of DSL use different frequency bands, but all use relatively high frequency bands.

While ADSL can be configured to reserve some bandwidth for services such as ISDN basic rate, POTS band 2 is frequency-limited and can carry just one voice call. Other proposed DSL services do not have a POTS band at all, and provide transport without distinguishing between voice and data services.

DSL Equipment Includes Frequency Splitter—FIG. 4

Special equipment is needed at both the customer premises and at the phone company's central office where the customer's copper phone line ends. Analog devices called frequency splitters are typically used to separate the low-frequency POTS band from the high-speed data bands. FIG. 4 is a diagram of a DSL phone line highlighting the frequency splitters.

Copper telephone line 20 is a pair of copper wires running from central office 8 to the customer. The phone customer has installed customer premises equipment 6. Since DSL uses high frequencies for data traffic and POTS uses low frequencies for voice calls, the signal received over POTS telephone line 20 must be split into high- and low frequency components. Splitter 46 contains a low-pass filter that outputs the low-frequency components from copper telephone line 20. These low-frequency components carry the voice calls that are sent to telephone set 10. Telephone set 10 is a standard POTS analog telephone set. Additional phone sets, fax machines, or voice-band modem equipment can be connected to telephone set 10 as phone-line extensions as is well-known.

Splitter 46 also contains a high-pass filter that outputs the high-frequency components to DSL modem 48. DSL modem 48 receives the high-frequency analog signal from splitter 46 and converts it to downstream digital data during the receiving window. During the transmitting window, it converts the upstream data into high-frequency analog signal. Splitter 46 mixes this high-frequency analog signal from DSL modem 48 with the low-frequency voice from telephone set 10 and transmits the combined signal over copper telephone line 20 to central office 8.

Central office 8 receives copper telephone line 20 and splits off the high-frequency components with splitter 16. The high-frequency components from splitter 16 are sent to DSL modem 47, which converts the analog high-frequency signal to an upstream digital data. DSL line card 50 includes DSL modem 47 and, in some embodiments, splitter 16. The data stream can then be connected to a high-speed data highway or backbone.

Splitter 16 sends low-frequency components to conventional telephone switch 19, which includes a line card similar to conventional line cards that terminate POTS lines. Conventional telephone switch 19 uses a PCM highway or circuit switched network that connects this voice call to remote voice-band equipment such as a telephone set.

Incoming voice calls received by conventional telephone switch 19 are combined by splitter 16 with high-frequency data traffic from DSL modem 47. The combined signal is transmitted over copper phone line 20 to customer premises equipment 6.

While such ADSL equipment is useful, only a small portion of the bandwidth is reserved for voice calls. While data rates are high, the ADSL line is not a true replacement for a T1 line, since the ADSL line cannot be partially allocated for multiple voice calls.

What is desired is a DSL system that can carry multiple voice calls. It is desired to use a high-speed DSL line to carry many voice calls. It is further desired to use idle voice bandwidth for data traffic. It is desired to flexibly allocate the bandwidth of a DSL line to voice and data traffic. It is desired to change the allocation of voice bandwidth as voice calls are received and terminated. Dynamic allocation of the bandwidth of a DSL line among voice and data traffic is desirable, without corruption or interruption of the data.

SUMMARY OF THE INVENTION

A dynamically-allocating Digital-Subscriber Line (DSL) modem dynamically allocates bandwidth among voice calls and unchannelized user data. The modem has a plurality of local voice lines. Each of the local voice lines is for carrying a voice call.

A data stream sends user data to a telephone network. A DSL connection to a DSL telephone line connects to a central office connected to the telephone network. A formatter is coupled to the DSL connection and receives the user data from the data stream and voice calls from the plurality of voice lines. It formats the user data and the voice calls into timeslots for transmitting over the DSL telephone line to the central office.

A current-format storage is coupled to control the formatter. It stores a current allocation of the timeslots. The current allocation indicates which timeslots are carrying voice calls and which timeslots are carrying the user data.

A next-format generator is coupled to the current-format storage. It generates a next allocation of the timeslots. The next allocation of the timeslots has more timeslots allocated to voice calls when a new voice call is initiated, but fewer timeslots allocated to voice calls when a voice call is terminated. Thus allocation of the timeslots for voice calls and user data is dynamically adjusted as voice calls are initiated and terminated.

In further aspects of the invention the next-format generator has an off-hook detector that is coupled to the plurality of local voice lines. It determines when a local voice line is off-hook. State means stores a current state of local voice lines that are off hook. An allocater is coupled to the state means. It changes an allocation of a timeslot from the user data to a voice call when an additional voice line is off-hook, but changes allocation of a timeslot from a voice call to the user data when a voice line is no longer off-hook.

In still further aspects of the invention the next allocation of the timeslots is transmitted to the central office over the DSL telephone line before the next allocation becomes the current allocation. Thus timeslot allocations are transmitted over the DSL telephone line before taking effect. The next allocation is latched into the current-format storage from the next-format generator when a next superframe begins to be transmitted over the DSL telephone line. Thus allocations are changed at superframe boundaries.

In other aspects the timeslots each transmit 64-Kbits per second over the DSL telephone line, and each timeslot is able to carry exactly one voice call. The DSL telephone line is divided into enough timeslots so that a maximum number of voice calls that can be simultaneously carried is at least three simultaneous voice calls.

In other aspects of the invention the superframe contains a plurality of network frames. Each network frame is synchronized to a telephone-network timing reference. Each network frame contains a plurality of low-level frames. Each low-level frame contains the timeslots that are each allocated to either voice calls or the user data. The timeslots are repeated for each low-level frame in the network frame, and the network frame is repeated for each network frame in the superframe. Thus the timeslots are repeated at a lowest level of a three-level framing structure, but allocations of the timeslots are changed only at a highest level of a framing structure.

In further aspects, each timeslot contains 8 bits, and the low-level frame is repeated at a rate of 8 kHz. Thus each timeslot carries 64 Kbits per second of data or voice-call information.

BRIEF DESCRIPTION OF THE DRAWINGS

FIGS. 11A–11C detail the framing structure for the switchable voice/data DSL channels.

FIGS. 12A–12C illustrate an example of DSL framing for a 384-Kbit data rate.

FIG. 16 illustrates alignment of Reed-Solomon Codewords to every fourth superframe boundary.

FIG. 17 shows that timeslots at the end of each low-level frame can be used as padding to keep synchronization.

DETAILED DESCRIPTION

The present invention relates to an improvement in Digital-Subscriber Lines (DSL). The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that voice-call bandwidth should be dynamically allocated as needed by incoming and outgoing calls. During peak calling times, additional bandwidth is taken away from data transfers and used for voice calls. During low-calling periods, most of the bandwidth is available for data transfers.

Traditional DSL using frequency-splitters provide only one voice channel. While this is useful for home users, larger organizations such as corporations need many voice lines. The inventors have realized that the framing of data for DSL can be extended to carry voice traffic. Timeslots can be reserved for voice channels as new voice calls are made or received. The inventors have further realized that low-level frames can be allocated for voice or data traffic on an as-needed basis.

Figure 1:
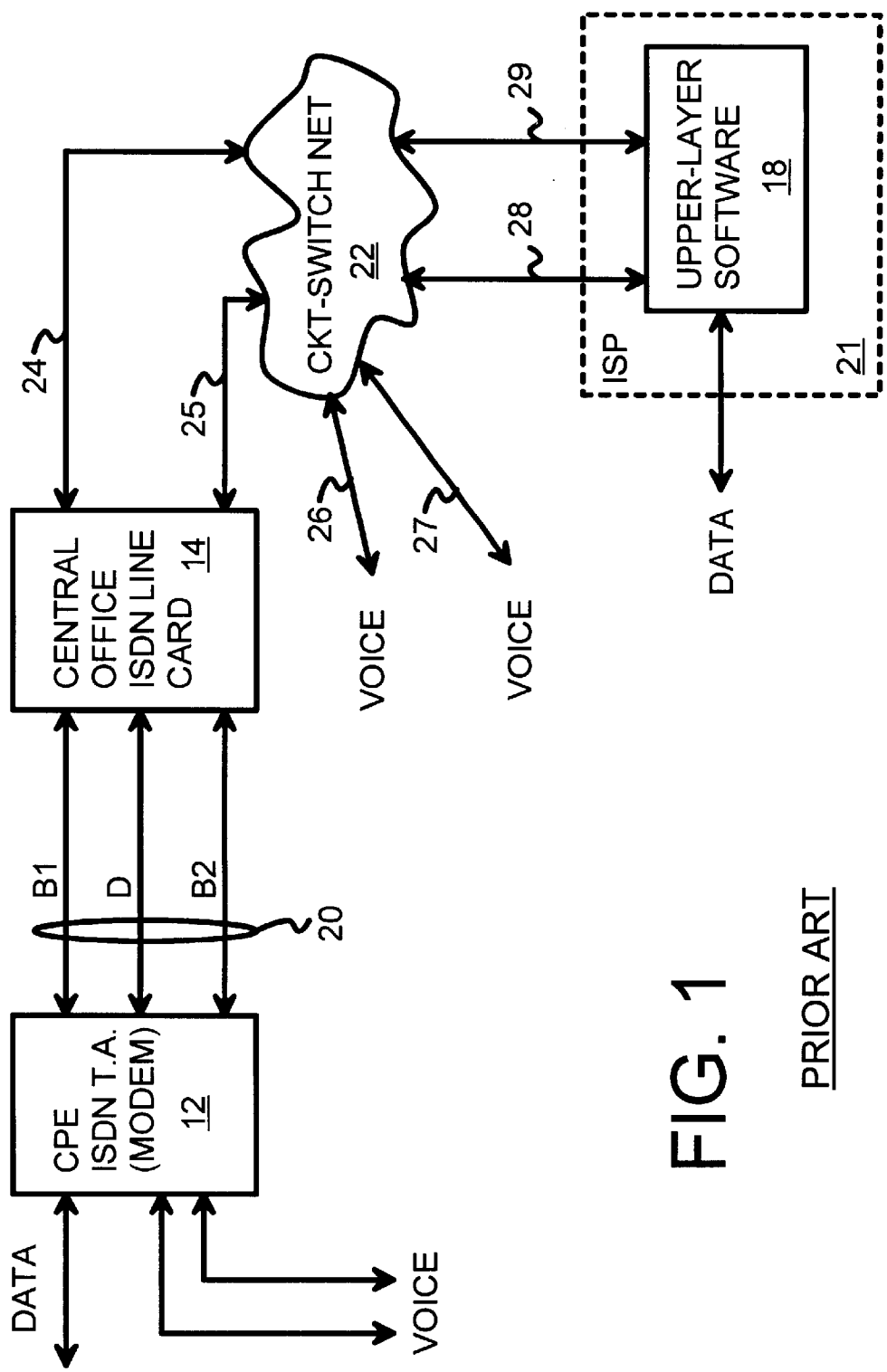
FIG. 1 shows an ISDN line used for both voice and data traffic.
Figure 2:
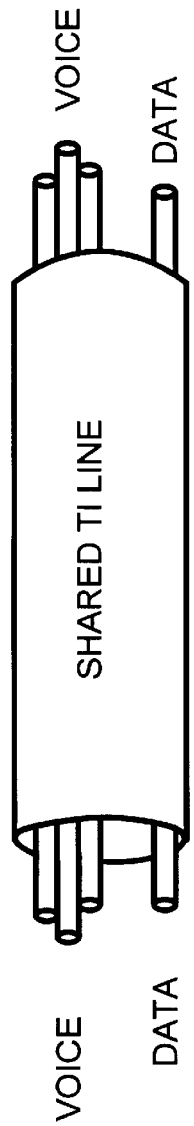
FIG. 2 highlights a high-speed T1 phone line that has fixed allocations of its bandwidth to voice and data traffic.
Figure 3:
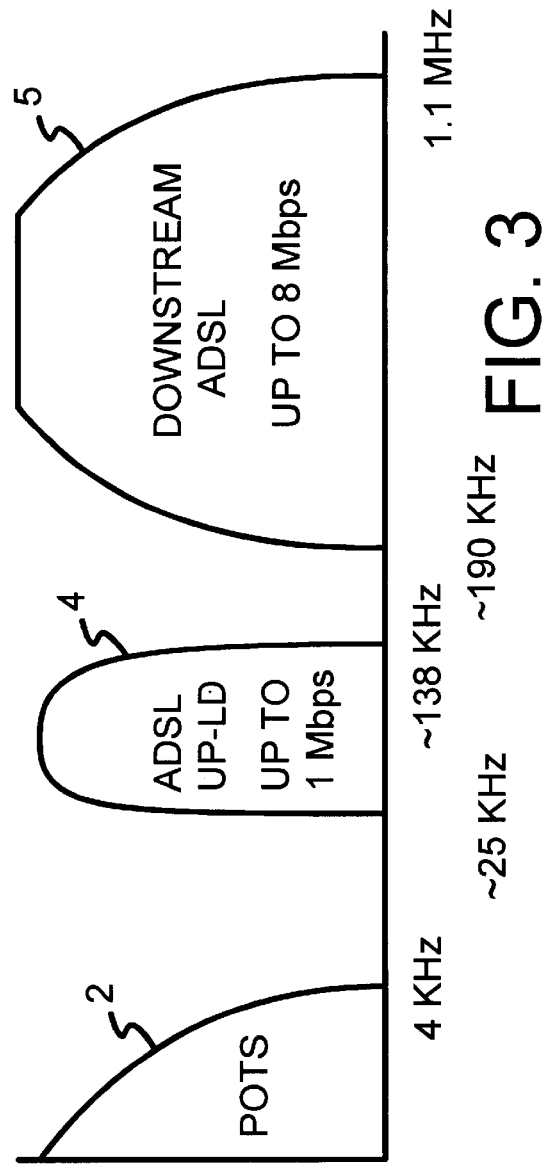
FIG. 3 is a graph of DSL frequency bands with a lower POTS band.
Figure 4:
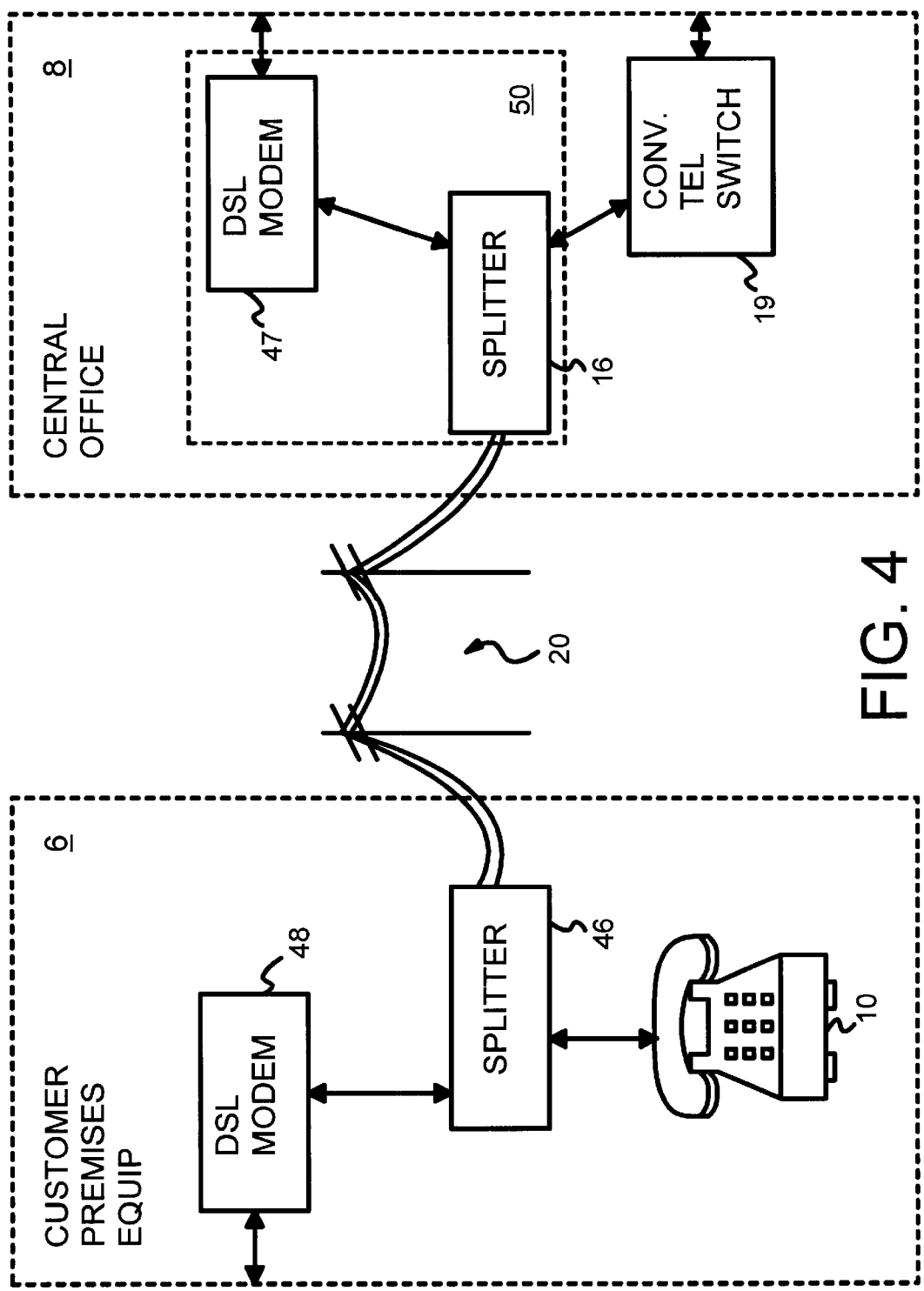
FIG. 4 is a diagram of a DSL phone line highlighting the frequency splitters.
Figure 5:
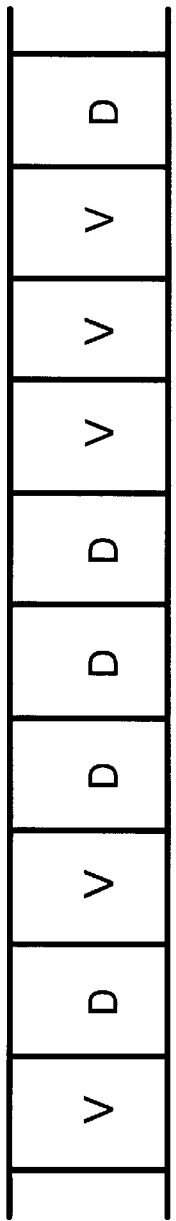
FIG. 5 shows time slots on a DSL line allocated for voice and data traffic.

FIG. 5 shows time slots on a DSL line allocated for voice and data traffic. As voice calls are received or made, additional time slots are allocated to voice calls. As voice calls end, time slots are de-allocated from voice and reallocated for data, increasing the available data bandwidth.

The time slots allocated are low-level time slots that are repeated over many frames. The relatively slow rate that voice calls are made and terminated allows allocation to be made infrequently. While making allocations each frame might be the straightforward, logical solution, the inventors prefer to make allocations less frequently.

The inventors group frames together into a superframe. Each superframe contains six 1-KHz frames, or 48 8-KHz frames. Allocations are made for each superframe and remain in effect for the entire superframe. Thus voice/data allocations are made every 6 milliseconds.

Figure 6:
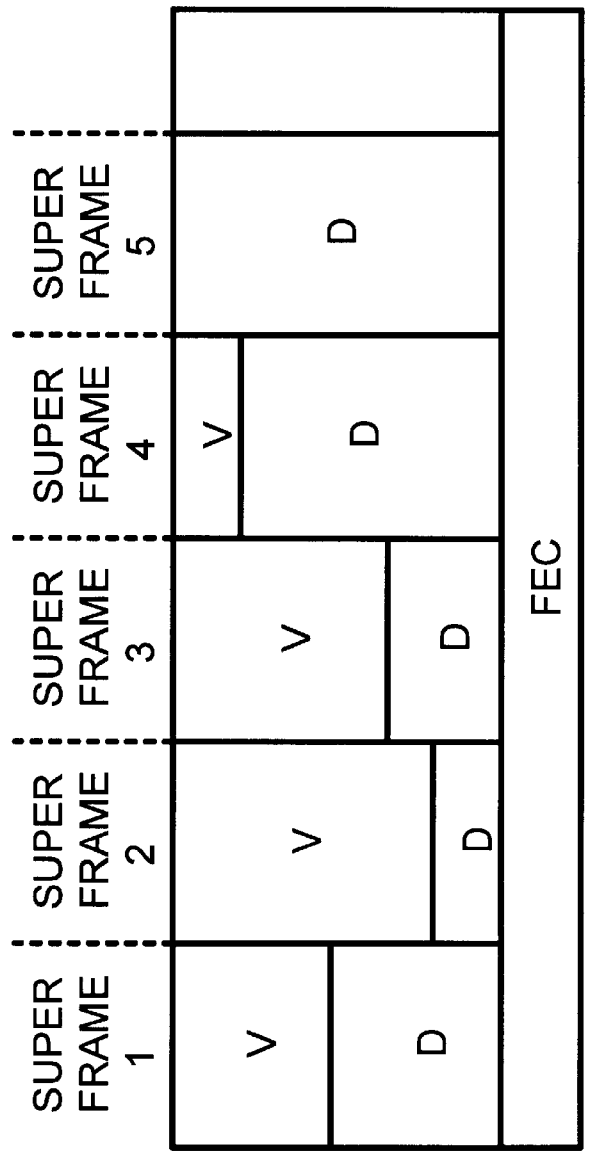
FIG. 6 illustrates dynamic allocation of voice and data traffic on a superframe basis.

FIG. 6 illustrates dynamic allocation of voice and data traffic on a superframe basis. Each superframe last for 6 milliseconds. Allocations are made just once for the entire superframe. While the allocations are for timeslots of low-level frames, the allocation of timeslots in these low-level frames is repeated for each of the low-level frames in a superframe.

During superframe 1, voice calls are allocated about half of the available bandwidth, leaving data traffic with the other 50% of the DSL-line's bandwidth. Additional voice calls are made or received during superframe 1, and additional bandwidth is allocated to voice calls for superframe 2. In superframe 2, voice calls occupy about 80% of the bandwidth, reducing data traffic to 20%.

One or more of the voice calls ends, so that in superframe 3, voice-call bandwidth drops from 80% to about 70% of the bandwidth, increasing data traffic to 30%. Many of the voice calls end during superframe 3, so that only 20% of the bandwidth is needed for voice in superframe 4. Data bandwidth increases to 80%. The last voice calls end, so that in superframe 5, all the bandwidth is allocated to data traffic. Some of the bandwidth is reserved for overhead signaling, such as sync patterns or error correction. In particular, forward-error-correction (FEC) bytes can be sent with each superframe. FEC bytes use Reed-Solomon encoding for error correction.

Figure 7:
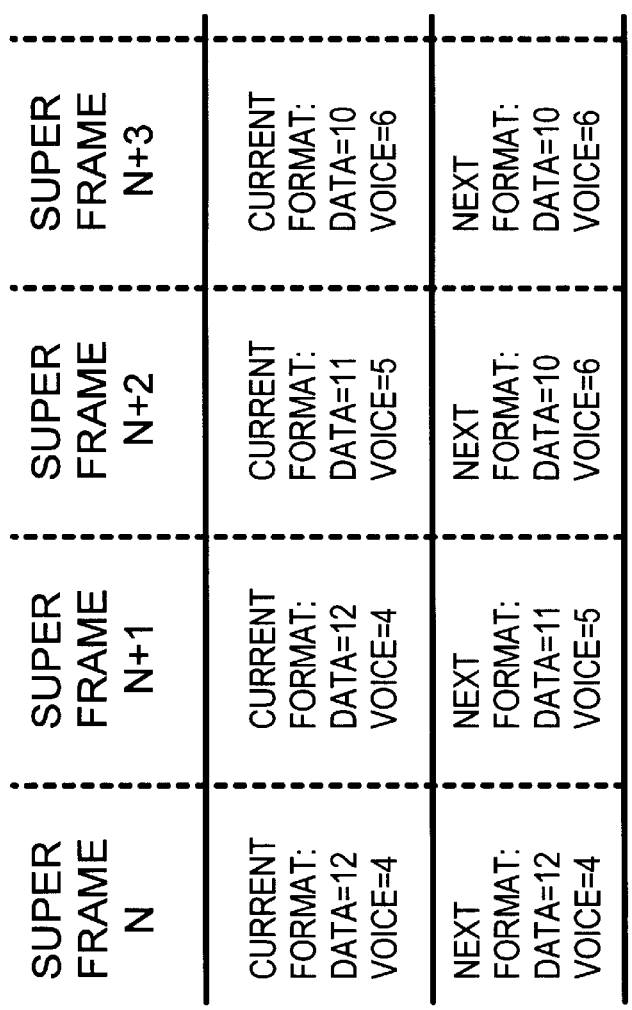
FIG. 7 highlights the pipelining of voice/data allocation of time slots.

Allocation Pipelining—FIG. 7

FIG. 7 highlights the pipelining of voice/data allocation of time slots. Superframe N has a current format that allocates 12 time slots of each low-level frame to data, while allocating 4 time slots to voice calls. No new calls are received during superframe N, so the next format generated during superframe N for the next superframe N+1 is identical.

During superframe N+1 a new call is made or received. Another timeslot needs to be allocated to voice. The next format is set to 5 voice timeslots and data timeslots are reduced to 11. This becomes the current format in the next superframe N+2.

In superframe N+2 another new call comes in, and another timeslot is allocated by changing the next format to 6 voice and 10 data timeslots. This next format becomes the current allocation format for superframe N+3. Finally, in superframe N+3, no change in voice calls occurs, so the next format remains as the current format.

Figure 8:
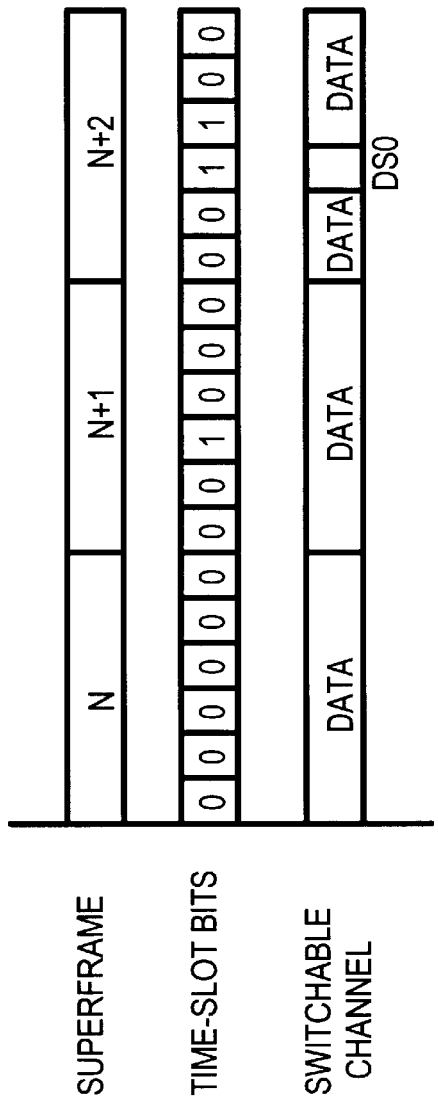
FIG. 8 highlights pipelining of low-level timeslot allocations to voice and data.

Pipelining of Time-Slot Allocations—FIG. 8

FIG. 8 highlights pipelining of low-level timeslot allocations to voice and data. In this example each superframe contains many low-level frames. Each low-level frame is composed of six timeslots that can be allocated to either data or voice traffic. These allocation are repeated for all the low-level frames in a superframe. The allocations are determined in the preceding superframe, but are not performed until the next superframe begins.

A set of time-slot bits are used to indicate which time slots are allocated to voice or to data. A zero bit indicates that the time slot is to be allocated to data for all low-level frames in the next superframe; a one bit indicates that the time slot is to be allocated as a voice channel.

During superframe 1, all time-slot bits are zero. This allocates all time slots to data in the next superframe, N+1. During superframe N+1 a voice call is received. The third time slot is allocated to voice by setting the third of six time-slot bits. When this allocation is implemented at the beginning of superframe N+2, the third of every six timeslots in each of the many low-level frames is allocated to voice. This one timeslot can carry one voice call, known as a DS0 channel.

The timeslot bits only control timeslot allocation in one direction. Allocations are made by both modems for their outgoing data, and each modem receives an allocation format for its incoming data stream. The apparatus shown for each modem is duplicated on the other modem for allocation control of the opposite direction.

Figure 9:
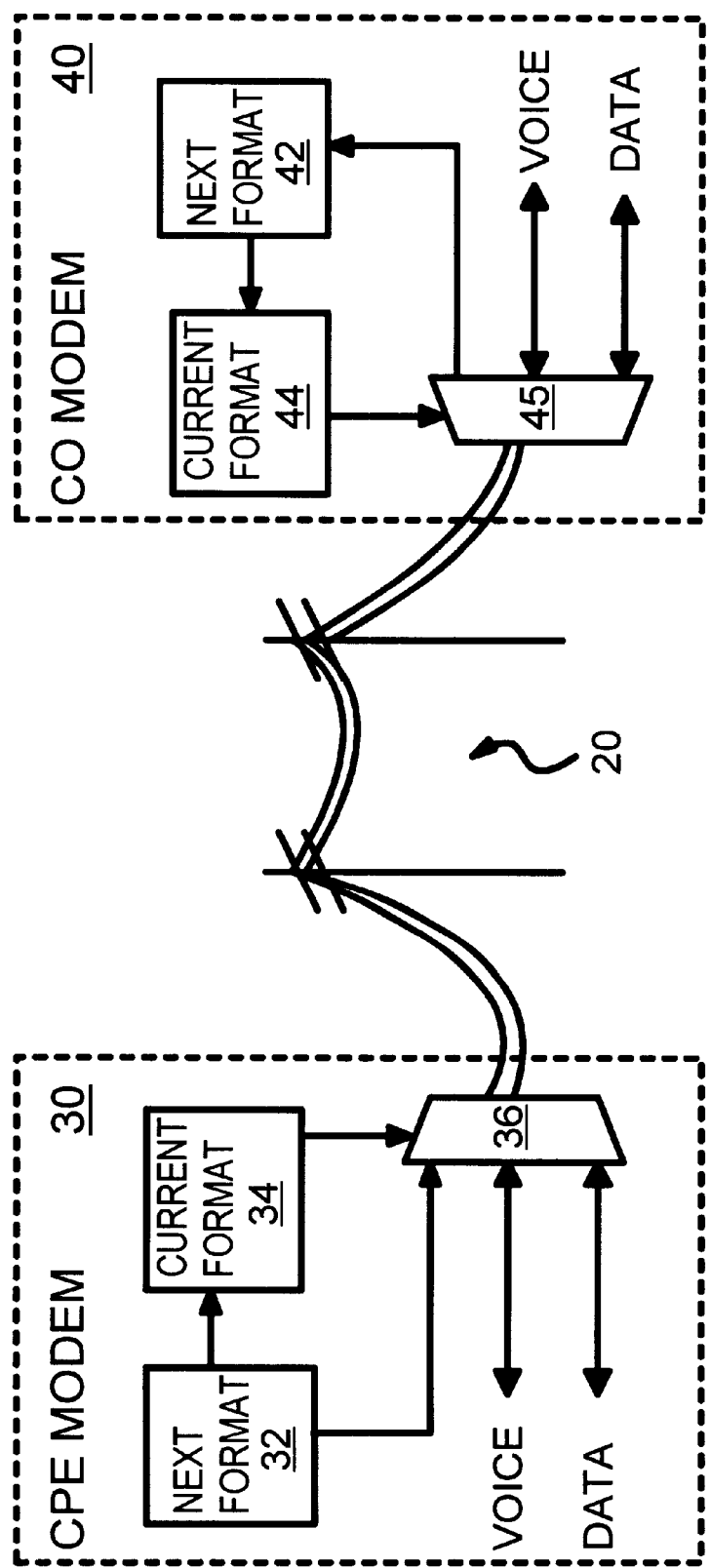
FIG. 9 shows a DSL line with DSL modems that re-allocate timeslots to voice and data traffic.

Voice/Data Allocating DSL Modems—FIG. 9

FIG. 9 shows a DSL line with DSL modems that re-allocate timeslots to voice and data traffic. When a channel needs to be added or removed for voice calls, the new format of time-slot bits are generated and loaded into next-format register 32 in CPE modem 30. This next format is transmitted through formatter 36, over DSL telephone line 20 to central-office (CO) modem 40. The next format is contained in frame-overhead bytes, such as the frame-format field shown later in FIG. 13. Formatter 45 extracts the next-format field from the incoming line data and writes it to next-format register 42 in CO modem 40.

At the end of the current superframe, the next format from next-format registers 32, 42 are latched into current format registers 34, 44. The same format of time-slot bits is contained in registers 34, 44. In CPE modem 30, current-format register 34 controls formatter 36, time-multiplexing data and voice calls to the allocated timeslots. In CO modem 40, current-format register 44 controls formatter 45, time-multiplexing data and voice calls to the allocated timeslots.

Figure 10:
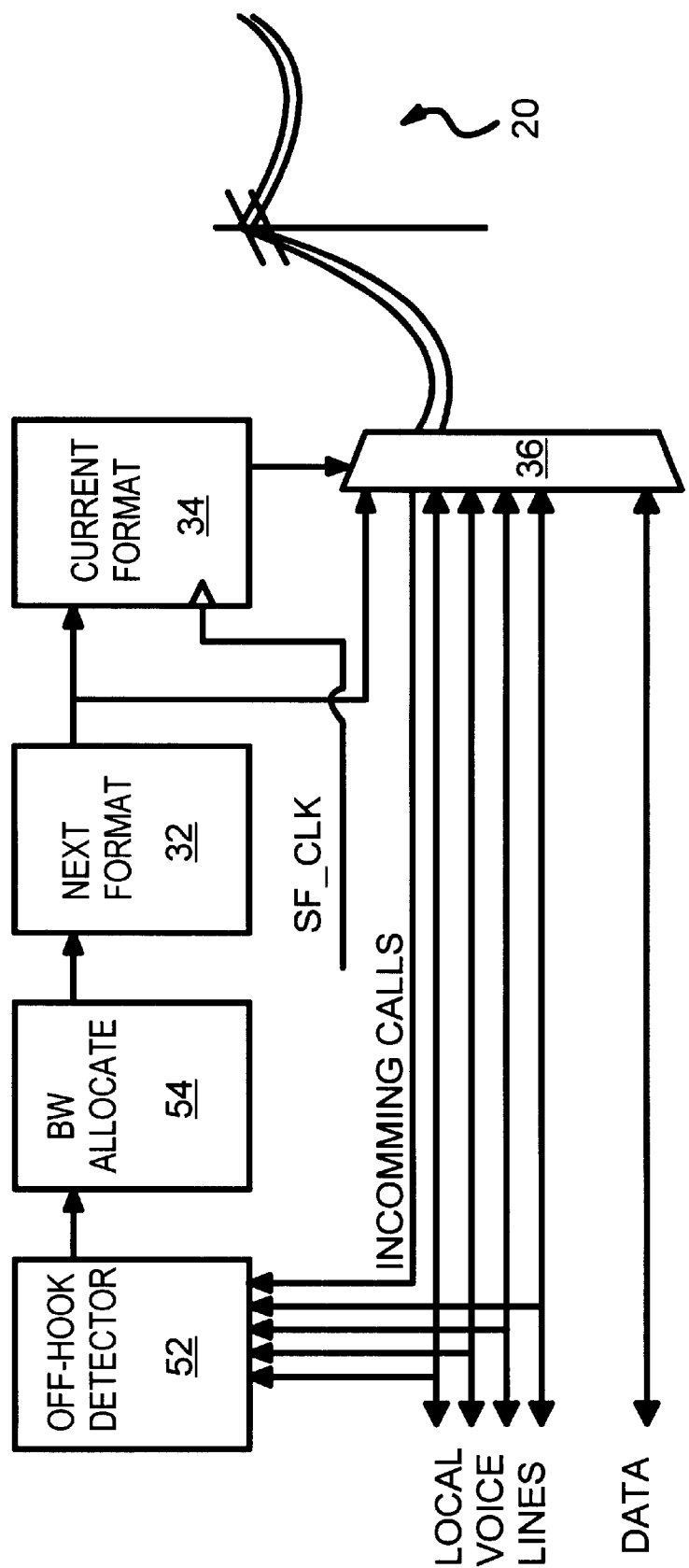
FIG. 10 is a DSL modem that allocates time slots when local voice lines are off-hook.

Allocation to Voice Calls When Off-Hook Detected—FIG. 10

FIG. 10 is a DSL modem that allocates time slots when local voice lines are off-hook. CPE modem 30 formats data and local voice lines into frame timeslots based on a timeslot bits. These format bits are stored in current-format register 34 and control formatter 36 that drives DSL telephone line 20. At the end of a superframe, superframe clock SF_CLK clocks the next format from next-format register 32 into current-format register 34, thus updating the time-slot allocation.

When a local user initiates a new voice call by lifting a handset of a local telephone, off-hook detector 52 detects the off-hook condition by sensing loop current flow. Likewise, when a local user hangs up the handset, off-hook detector 52 detects that a local voice line is on-hook and no longer in use. The total number of local voice lines that are off-hook are counted, and the sum is the number of active voice calls.

The total number of voice calls indicates the voice bandwidth that needs to be allocated for the next superframe. Each timeslot can carry one voice call, so the number of timeslots allocated is equal to the number of voice calls counted by off-hook-detector 52. Bandwidth allocater 54 generates a string of timeslot bits that have enough slots allocated to match the number of voice calls. Bandwidth allocater 54 loads the next format into next-format register 32.

New incoming calls from the CO modem are detected by digital signaling bits or an analog ring voltage and are signaled over DSL telephone line 20 using control signals in the framing overhead fields. The number of incoming calls is extracted by formatter 36 and sent to bandwidth allocater 54. The total number of voice calls is generated that includes the local voice calls counted by off-hook detector 52 and the new incoming calls from the remote modem. These incoming calls are those that are ringing but have not yet been answered. Once answered, off-hook detector 52 counts the established call.

Framing Structure—FIG. 11

FIGS. 11A–11C detail the framing structure for the switchable voice/data DSL channels. In FIG. 11A, the high-level superframe is illustrated. Each superframe is exactly 6 milliseconds in duration, and contains 6 1-KHz frames (1 millisecond each frame) and a superframe pad of 0 to 5 bits. The number of superframe pad bits depends on the exact modem bit-rate. Line rates of 126 to 1536 Kbit are supported.

The framing fields in the superframe each contain 12 bits, except for the first framing field, which contains 9 to 15 bits. The number of framing bits in the first framing field is varied to adjust the superframe's length to exactly match a multiple of the 8-KHz network reference clock at the central office. These framing fields for each superframe are combined as shown later in FIG. 13 for DSL control signaling. In particular, the next-format of the time slots, which contains the allocations of channels to voice or data for the next superframe, is contained in these framing fields for the superframe.

The six user-data fields each contain from 114 to 1076 bits, depending on the DSL line rate. DSL lines can operate at different rates, depending on the length of the phone line, noise, and other factors.

FIG. 11B highlights one of the six user-data fields of the superframe. Together with the 12 superframe-level framing bits, this forms a 1 KHz frame. The 1 KHz frame includes eight 8-KHz low-level frames. Each of the 8 KHz low-level frames contains 14 to 134 bits, depending on the DSL line rate. Pad bits for the 1 KHz frame can include up to 7 bits.

FIG. 11C highlights a low-level 8-KHz frame that contains the time slots that are allocated to voice or data traffic. The 8-KHz frame is divided into one or more time slots. Each time slot contains 8 bits, and is repeated at the 8-KHz frame rate, for a channel rate of 64 Kbit. This 64 Kbit rate is sufficient to carry one voice call when allocated to voice. Up to seven pad bits can be added to the 8-KHz frame. For the lowest DSL line rate, each 8-KHz frame has just 14 bits, and thus has only one 8-bit timeslot and 6 pad bits. The maximum line rate has 134 bits in each 8-KHz frame, which is divided into 16 timeslots, with 6 pad bits. Intermediate line rates have between 2 and 15 timeslots.

The combination of the three levels of pad bits is used to adjust the superframe's length to exactly 6 milliseconds. Having pad bits for each level increases flexibility for different line rates when matching fixed network clocks.

384-Kbit Framing Example—FIGS. 12A–C

FIGS. 12A–C illustrate an example of DSL framing for a 384-Kbit data rate. The DSL modem line rate is 416.5 Kbit, but framing overhead reduces the data rate to 384 Kbit. Since each high-level framing field has 12 bits for each 1 millisecond frame, the superframe-overhead is 12 Kbit for all line rates. In this example, the pad bits occupy another 20.5 Kbit. The efficiency is 92%.

In FIG. 12A, each user-data field in each of the six 1-KHz frames contains 404 data bits. The superframe pad is 3 bits. FIG. 12B shows that each of the six 1-KHz frames contains eight frames of 50 bits each. The 1-KHz pad field has 4 bits, to give a total of 8*50+4=404 bits. The 50 bits in each 8-KHz low-level frame is divided into six 64-Kbit timeslots, each with 8 bits. The remaining 2 bits are 8-Khz pad bits. Each of the six timeslots can be allocated for a voice call (a DS0 channel) or for unchannelized data.

The pad bits occupy a total of 20.5 Kbit of bandwidth. Each intermediate 1-KHz frame has four pad bits. Since these frames occur at a rate of 1 KHz, the intermediate pad bits occupy 4 KHz. The three superframe pad bits are spread among the six 1-KHz frames, and so add 0.5 pad bits per intermediate frame, or 0.5-Kbit of bandwidth. The two low-level pad bits occur for each of the eight 8-KHz frames, for a total of 2*8=16 pad bits per 1-KHz frame, a bandwidth of 16 Kbit. The total bandwidth occupied by the pad bits is thus 0.5+4+16=20.5 Kbit. Note that low-level pad bits occupy more bandwidth than high-level pad bits, since the low-level pad bits are repeated more frequently.

Rather than put all the pad bits at the highest (superframe) level, the pad bits are placed in the low-level frames that are spread throughout the superframe. This minimizes the offset or peak delay on the DS0 voice channels. If the pad bits were simply grouped in the superframe pad field, the transmission of this field would take a long time at low bit rates, causing increased delay on the DS0 data. Likewise, the superframe framing bits are spread throughout the superframe in 12-bit fields for each 1-KHz frame. This makes the timeslots occur at a more even rate.

Figure 13:
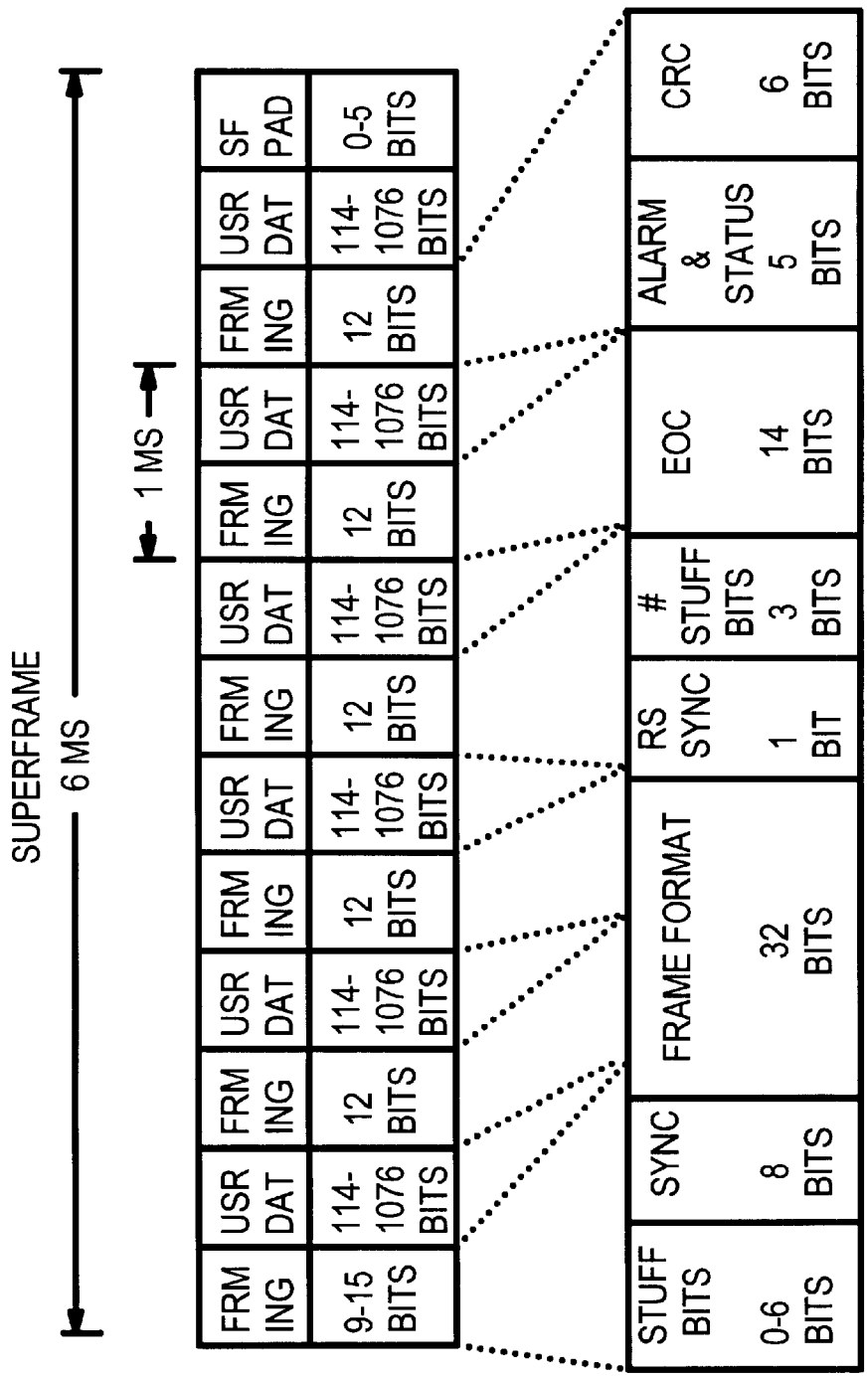
FIG. 13 shows that the framing bits in the superframe include the next-frame allocation format.

Superframe Bits Contain Next-Frame Allocation—FIG. 13

FIG. 13 shows that the framing bits in the superframe include the next-frame allocation format. The framing bits of each superframe include the variable first field of 9–15 bits, and the five 12-bit framing fields. All these bits are combined into a 69- to 75-bit control word. The first framing field is variable to match the modem line rate to the network timing reference, such an 8-KHz pulse-code-modulation (PCM) clock at a central office.

The control word begins with up to six stuff bits. These bits are added so that the sync pattern that follows is aligned with the 8-KHz network reference clock. The sync pattern is the 8-bit pattern 11011100. A valid CRC must also be found for the sync pattern to be accepted as valid.

The Frame format field contains the next-format allocation of the timeslots to voice or data for the next superframe. It provides one bit for each of the 32 possible DS0 timeslots. It allocates the switchable timeslots between the unchannelized data and dedicated DS0 voice channels. The first bit transmitted corresponds to the first 64 Kbit timeslot. A one indicates channelized DS0 voice while a zero indicates that the timeslot become part of the unchannelized data. This field refers the next superframe. It is sent in advance so that both modems can change timeslot allocations at the same time, at the beginning of the next superframe. The new allocation format is only acted upon when the CRC is good; line errors thus are prevented from causing the wrong format to be set by a remote modem.

The timeslot bits only control timeslot allocation in one direction. Allocations are made by both modems for their outgoing data, and each modem receives an allocation format for its incoming data stream.

Error correction is enabled by setting the Reed-Solomon bit. When the Reed-Solomon Sync bit is set in a superframe, the first data byte in the following superframe is the start of a new Reed-Solomon code word. This bit transfers alignment information between the modems, so codeword boundaries can be recovered. The number of superframes between alignments is determined by a value programmed into a register.

The 3-bit # of stuff bits field indicates how many leading stuff bits will begin the next superframe. Up to six stuff bits precede the next superframe's sync pattern. The error and control channel (EOC) field has 14 bits used for managing the CPE modem. Control information is sent from the CO modem to the CPE modem using this field. The Alarm Status bits provide a direct signaling path between the modems. These five bits are directly managed by programming Alarm Control and Status registers in the modems. When a bad CRC occurs, these bits do not cause an interrupt and are instead ignored. The Alarm Status may be used to signal such conditions as Loss of Sync or Loss of Signal.

The six-bit cyclical-redundancy-check (CRC) is computed over all other overhead field in the control word, from the sync field to the alarm and status bits. The CRC is computed using the CRC-6 polynomial ($X^6+x+1$) and validates all the Sync, next-format, EOC, Alarm and Status bits. Framing overhead received with a bad CRC result is discarded and the previous valid version used.

Figure 14:
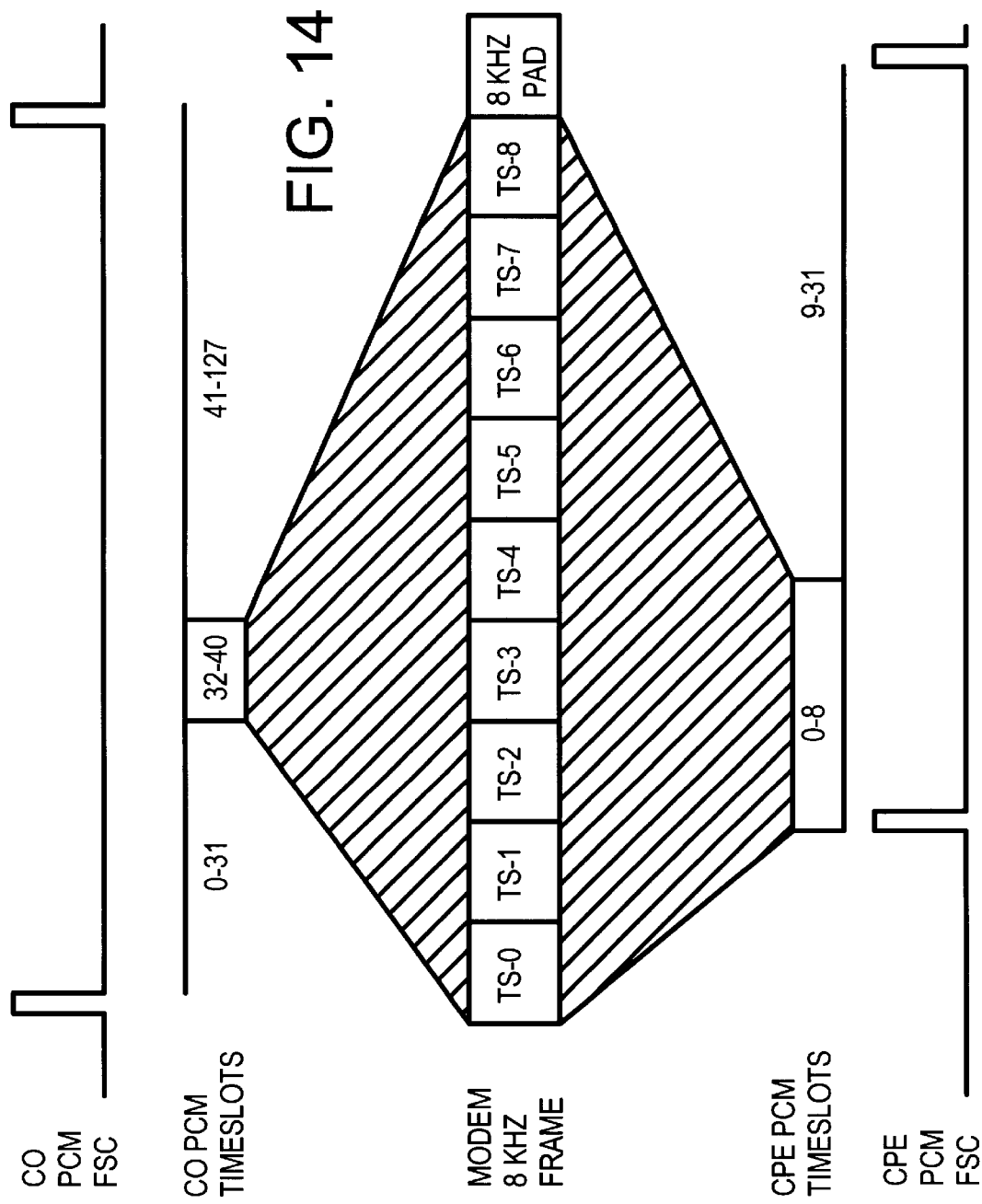
FIG. 14 is an example where all 9 timeslots are allocated to unchannelized data.

9-Timeslot Example—FIG. 14

FIG. 14 is an example where all 9 timeslots are allocated to unchannelized data. The modem line rate in this example is sufficient for nine 64-Kbit timeslots. The CPE modem can support up to 32 timeslots for each frame clock period. The CPE PCM frame clock operates at 8 KHz. The first nine CPE timeslots, 0–8, are allocated for unchannelized data. The user's data is fed to all nine timeslots.

The unchannelized data from the nine timeslots is received by the CO line card or modem, and assigned to CO timeslots 32–40. The CO equipment can operate at higher speeds and thus can accommodate as many as 128 64-Kbit timeslots for each period of the central office's PCM frame clock. This frame clock also operates at 8 KHz.

Figure 15:
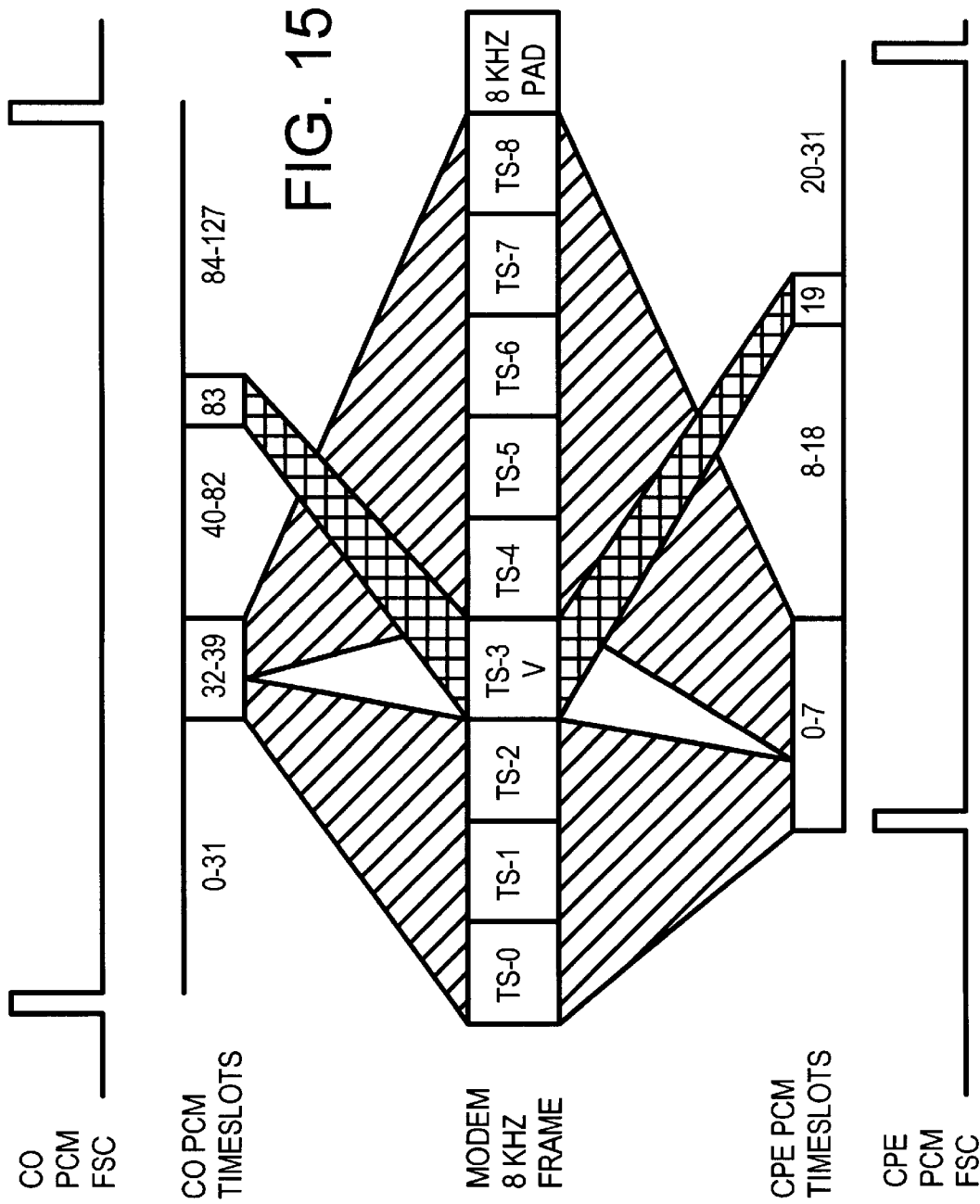
FIG. 15 shows an example when one channel has been allocated to voice.

One Channel Allocated to Voice—FIG. 15

FIG. 15 shows an example when one channel has been allocated to voice. When a voice call is made, one of the 64-Kbit channels is taken away from unchannelized data and allocated to a voice channel. The fourth timeslot, TS-3, is assigned to voice. The CPE modem's first 8 timeslots are allocated to unchannelized data, and drive the DSL line's timeslots TS-0 to TS-2, and TS-4 to TS-8. These data channels are received by the central office and assigned to CO timeslots 32–39. Other DSL lines could be occupying timeslots 0–31 in this example.

The voice channel, timeslot TS-3, is generated from CPE modem's PCM timeslot 19, and is received by the CO PCM timeslot 83.

Figures 16, 17:
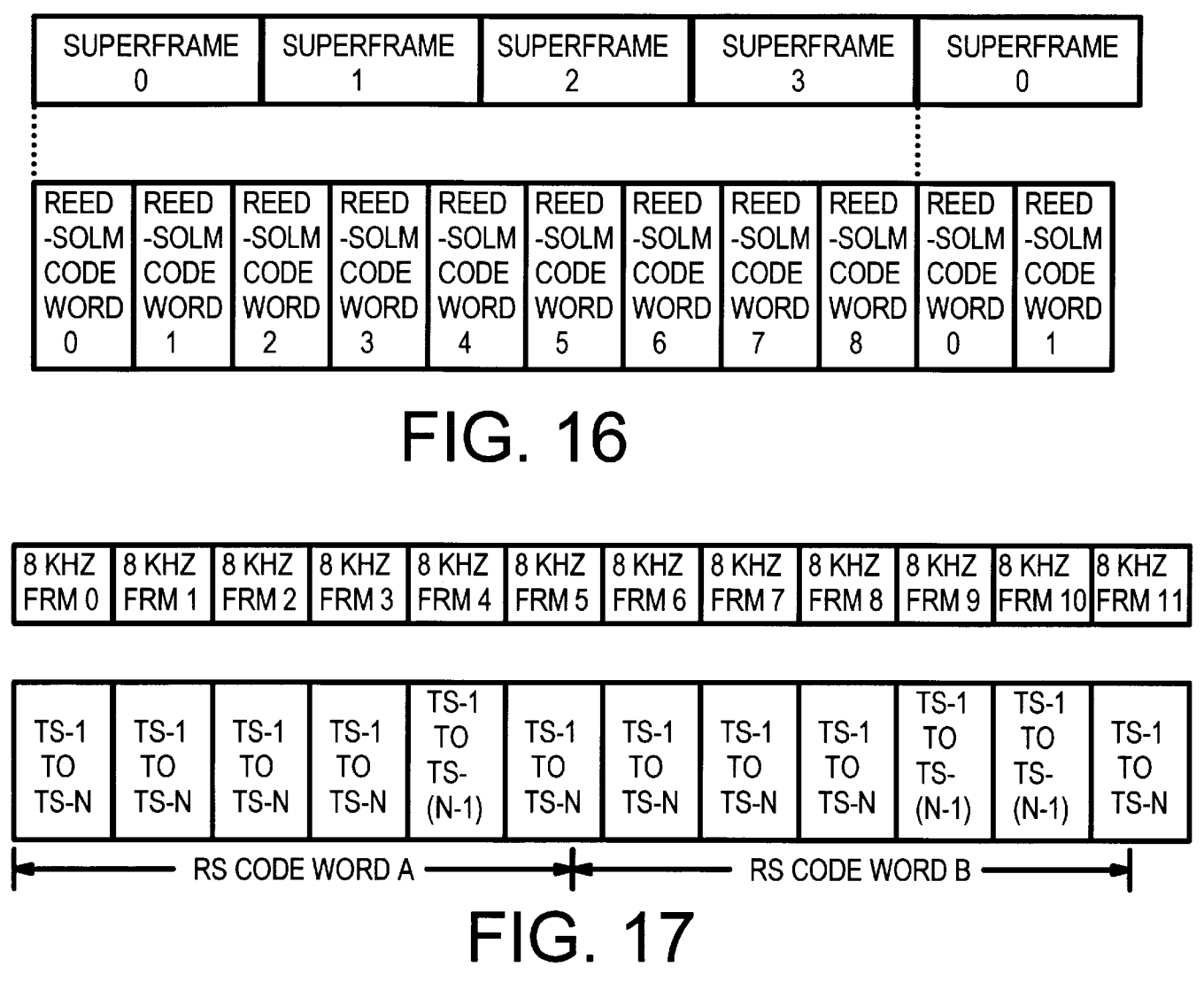

Forward Error Correction—FIGS. 16, 17

Error correction can be employed with the invention. For example, Reed-Solomon (RS) encoding can be used, such as 64/68 coding that attaches 4 bytes of error correction code (ECC) to every 64 data bytes. The group of 68 bytes is called a Reed-Solomon codeword. A syndrome can be generated from the 68-byte codeword received and compared to an expected syndrome to detect errors. The ECC bytes or syndrome can then be used to locate and correct any errors within the codeword.

The additional 4 ECC bytes for every 64 data bytes are transported in the timeslots, thus decreasing the effective data bandwidth. The relatively long Reed-Solomon codewords may not align exactly with each superframe, depending on the modem line rate. Thus the Reed-Solomon sync bit shown in FIG. 13 is set to signal that the next superframe begins a new RS codeword. The first timeslot of the next superframe contains the first data byte of the RS codeword, followed by the other 64 data bytes and then the 4 ECC bytes that end the codeword. Other codewords follow.

FIG. 16 illustrates alignment of Reed-Solomon Codewords to every fourth superframe boundary. In superframe 3, the RS sync bit is set to signal that the next superframe (superframe 0) is the start of a new series of RS codewords. The example shown is for a 256-Kbit data rate, which has four 64-Kbit timeslots. Nine RS codewords span four superframes.

FIG. 17 shows that timeslots at the end of each low-level frame can be used as padding to keep synchronization. Each 8-KHz frame uses all available timeslots. Frames 4, 9, and 10 use one fewer timeslot, only N-1 timeslots. This keeps the user payload (total payload minus Reed Solomon ECC bytes) equal to an integer multiple (N-1) of 64 Kbit. Codewords can begin and end within an 8-KHz frame, but always align with every fourth superframe boundary.

When some of the timeslots are allocated to voice, the voice data is considered part of the RS codeword. The voice timeslots can be sent directly to the PCM highway or circuit switched network from the receiving modem to reduce latency, rather than wait for RS decoding.

ADVANTAGES OF THE INVENTION

A DSL system can carry multiple voice calls. Using the invention, high-speed DSL lines are able to carry many voice calls. Idle voice bandwidth can be allocated for data traffic. This flexibility allows the bandwidth of a DSL line to be allocated to voice and data traffic as needed. The allocation of voice bandwidth is changed as voice calls are received and terminated. Dynamic allocation of the bandwidth of a DSL line among voice and data traffic more fully uses the available resources. An extension of the services provided by DSL is thereby achieved.

ALTERNATE EMBODIMENTS

Several other embodiments are contemplated by the inventors. For example the RS codewords can use interleaving. The modems can operate in many different modes and at different data and line rates. Many circuit implementations are possible. The modems may use different modulation techniques. A frequency-splitter may still be used to provide a POTS service independent of the DSL modem.

The frequency range of the DSL band can be varied. The frequency bandwidth can be reduced for lower data rates and/or for shorter telephone lines. While the term "line card" has been used, it is apparent that the functions described for the line card could reside on a printed-circuit-board substrate, a metal or ceramic substrate, or on other modular systems such as racks or boxes. The functions of the line card can be arranged on multiple substrates or integrated onto one or more silicon semiconductor chips.

The term "voice calls" and "voice channels" have been used as a shorthand for channelized DS0 channels that most often carry voice calls. However, DS0 channels can also carry analog modem traffic, fax, or digital data services such as X.25, or may be combined for video conferencing applications.

Processing of the DSL data streams can occur using processors in a DSP, or with time-sharing of a fast DSP. A large analog driver with enough drive for the phone line is also normally added to the analog output of a D/A converter. Various signal processing techniques, such as Trellis encoding/Viterbi decoding and pre-coding/pre-emphasis can be used in an encoder/decoder, or not used in cost-sensitive applications. CAP modulation, QAM modulation, Discrete Multitone modulation, or other pass-band modulation techniques can be used.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A dynamically-allocating Digital-Subscriber Line (DSL) modem for dynamically allocating bandwidth among voice calls and unchannelized user data, the modem comprising:

a plurality of local voice lines, each of the local voice lines for carrying a voice call;

a data stream for sending user data to a telephone network;

a DSL connection to a DSL telephone line that connects to a central office connected to the telephone network;

a formatter, coupled to the DSL connection and receiving the user data from the data stream and receiving voice calls from the plurality of voice lines, for formatting the user data and the voice calls into timeslots for transmitting over the DSL telephone line to the central office;

current-format storage, coupled to control the formatter, for storing a current allocation of the timeslots, the current allocation indicating which timeslots are carrying voice calls and which timeslots are carrying the user data; and a next-format generator, coupled to the current-format storage, for generating a next allocation of the timeslots, the next allocation of the timeslots having more timeslots allocated to voice calls when a new voice call is initiated, the next allocation of the timeslots having fewer timeslots allocated to voice calls when a voice call is terminated, whereby allocation of the timeslots for voice calls and user data is dynamically adjusted as voice calls are initiated and terminated.

2. The dynamically-allocating DSL modem of claim 1 wherein the next-format generator further comprises:

an off-hook detector, coupled to the plurality of local voice lines, for determining when a local voice line is off-hook;

state means, for storing a current state of local voice lines that are off hook;

an allocater, coupled to the state means, for changing an allocation of a timeslot from the user data to a voice call when an additional voice line is off-hook, but changing allocation of a timeslot from a voice call to the user data when a voice line is no longer off-hook.

3. The dynamically-allocating DSL modem of claim 2 wherein the next allocation of the timeslots is transmitted to the central office over the DSL telephone line before the next allocation becomes the current allocation, whereby timeslot allocations are transmitted over the DSL telephone line before taking effect.

4. The dynamically-allocating DSL modem of claim 3 wherein the next allocation is latched into the current-format storage from the next-format generator when a next superframe begins to be transmitted over the DSL telephone line, whereby allocations are changed at superframe boundaries.

5. The dynamically-allocating DSL modem of claim 4 wherein the timeslots each transmit 64-Kbits per second over the DSL telephone line, wherein each timeslot is able to carry exactly one voice call.

6. The dynamically-allocating DSL modem of claim 5 wherein the DSL telephone line is divided into enough timeslots so that a maximum number of voice calls that can be simultaneously carried is at least three simultaneous voice calls.

7. The dynamically-allocating DSL modem of claim 1 wherein:

the superframe contains a plurality of network frames, each network frame being synchronized to a telephone-network timing reference, each network frame contains a plurality of low-level frames;

each low-level frame contains the timeslots that are each allocated to either voice calls or the user data, wherein the timeslots are repeated for each low-level frame in the network frame, and the network frame is repeated for each network frame in the superframe, whereby the timeslots are repeated at a lowest level of a three-level framing structure, but allocations of the timeslots are changed only at a highest level of a framing structure.

8. The dynamically-allocating DSL modem of claim 7 wherein each timeslot contains 8 bits, and wherein the low-level frame is repeated at a rate of 8 kHz, whereby each timeslot carries 64 Kbits per second of data or voice-call information.

9. The dynamically-allocating DSL modem of claim 7 whereby a number of timeslots in the low-level frame depends upon a line rate of the DSL telephone line, but a number of network frames in the superframe, and a number of low-level frames in the network frame is constant for all line rates, whereby higher DSL telephone line rates support more timeslots and more voice calls or data traffic for a same fixed higher-level framing structure.

10. A method of dynamically allocating voice and data traffic over a Digital-Subscriber Line (DSL) comprising:

arranging voice calls and data traffic into timeslots, each timeslot able to carry one voice call or a portion of the data traffic;

grouping the timeslots into a low-level frame;

repeating the low-level frame a plurality of times to create a network frame;

repeating the network frame a plurality of times and adding super-framing bits to generate a superframe;

sending the superframe over a DSL line to a remote modem;

determining when a new voice call is being initiated;

re-allocating a timeslot from data traffic to the new voice call;

determining when an old voice call is being terminated;

re-allocating a timeslot from the old voice call to the data traffic;

sending a next allocation of the timeslots over the DSL line to the remote modem before a next superframe begins to be transmitted;

changing arrangement of the voice calls and the data traffic into the timeslots to correspond to the next allocation when the next superframe begins to be transmitted;

whereby the timeslots are allocated as new voice calls are made and old voice calls are terminated.

11. The method of claim 10 further comprising:

generating a cyclical-redundancy-check (CRC) checksum from the next allocation;

not changing arrangement to correspond to the next allocation when the CRC has an error value, whereby allocations are checked by a CRC.

12. The method of claim 10 further comprising:

adding pad bits after each network frame to make the network frames synchronous with a network timing reference clock.

13. The method of claim 12 further comprising:

combining the pad bits after each network frame into a superframe control word, the superframe control word including the next allocation to the remote modem.

14. The method of claim 13 further comprising:

adjusting a number of the pad bits to adjust a length of the superframe to exactly match a multiple of an 8-KHz network reference clock at a central office.

15. The method of claim 10 further comprising:

increasing a number of timeslots in each low-level frame when the DSL line has a higher line rate, but decreasing the number of timeslots in each low-level frame when the DSL line has a lower line rate, whereby the number of timeslots for allocation is adjusted for a line rate of the DSL line.

* * * * *